(12) United States Patent
Morgan et al.

(10) Patent No.: US 10,416,891 B2
(45) Date of Patent: Sep. 17, 2019

(54) SYSTEMS AND METHODS FOR TRANSITIONING AND UPDATING/TAILORING MACHINE INSTRUCTIONS FROM A FIRST SYSTEM WITH AN OLDER OR INITIAL ONE OR SET OF COMPONENTS TO A SECOND SYSTEM OR PLATFORM WITH ONE OR MORE DIFFERENT COMPONENTS AND NEW OR MODIFIED OPERATIONS OR FUNCTIONS ALONG WITH ADDITIONAL POTENTIAL APPLICATIONS INCLUDING USE IN NETWORK SECURITY AND INTRUSION DETECTION

(71) Applicant: The United States of America as represented by the Secretary of the Navy, Crane, IN (US)

(72) Inventors: Douglas N. Morgan, Bloomington, IN (US); Eric Morgan, Fredericksburg, VA (US); Clyde Paul Hager, Jr., Bloomington, IN (US); Nathan S. Popp, Springville, IN (US); George Vollman, Bloomington, IN (US); Dave P. Nordquist, Fredericksburg, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 54 days.

(21) Appl. No.: 15/706,520

(22) Filed: Sep. 15, 2017

(65) Prior Publication Data

US 2018/0074719 A1 Mar. 15, 2018

Related U.S. Application Data

(60) Provisional application No. 62/394,988, filed on Sep. 15, 2016.

(51) Int. Cl.
*G06F 3/06* (2006.01)
*G06F 13/40* (2006.01)
(Continued)

(52) U.S. Cl.
CPC ............ *G06F 3/0607* (2013.01); *G06F 3/061* (2013.01); *G06F 3/0659* (2013.01);
(Continued)

(58) Field of Classification Search
None
See application file for complete search history.

(56) References Cited

U.S. PATENT DOCUMENTS 4,625,081 A * 11/1986 Lotito ............... H04M 3/53316
379/196
6,052,077 A * 4/2000 Ogasawara ........ G11B 5/00813
341/161
(Continued)

*Primary Examiner* — Henry Tsai
*Assistant Examiner* — Aurangzeb Hassan
(74) *Attorney, Agent, or Firm* — Christopher A. Monsey (57) ABSTRACT

Systems and methods for transitioning and updating machine instructions from a first system with an older/initial component(s) to a second system or platform with one or more different components and new or modified operations or functions are provided. Embodiments enable improved obsolescence/configuration management and customization of the older/initial system's machine instructions (MI) to a target application/platform with new or modified capabilities. One exemplary system enables processing binary tape tracks for linear flash media over a universal serial bus (USB) to a personal computer (PC) card interface. User interfaces are provided for editing MIs to insert/modify functions or capabilities of obsolete MIs, e.g. binary tape tracks that are customized for a system with obsolete component(s) (e.g. tape drive), transferring data to/from a newer component (e.g. a linear flash media). Exemplary systems can include additional embodiments such as an intrusion
(Continued)

detection and warning system to detect unauthorized file management service commands.

15 Claims, 5 Drawing Sheets (51) Int. Cl.
*G06F 13/38* (2006.01)
*G06F 13/42* (2006.01)
*H04L 29/06* (2006.01)

(52) U.S. Cl.
CPC .......... *G06F 3/0679* (2013.01); *G06F 13/385* (2013.01); *G06F 13/4072* (2013.01); *G06F 13/4282* (2013.01); *G06F 2213/0042* (2013.01); *H04L 63/02* (2013.01)

(56) References Cited

U.S. PATENT DOCUMENTS

| | | | | |
|---|---|---|---|---|
| 2004/0008131 | A1* | 1/2004 | Fitzgerald | H03M 7/30 341/71 |
| 2006/0045242 | A1* | 3/2006 | Isaacson | H04M 3/22 379/88.17 |
| 2012/0179867 | A1* | 7/2012 | Chakravarty | G11B 27/322 711/111 |
| 2015/0220389 | A1* | 8/2015 | Kim | G06F 11/1048 714/764 |
| 2015/0363327 | A1* | 12/2015 | Chaitanya | G06F 3/0608 711/103 |
| 2016/0140041 | A1* | 5/2016 | Niu | G06F 3/06 711/103 |

* cited by examiner

SYSTEMS AND METHODS FOR TRANSITIONING AND UPDATING/TAILORING MACHINE INSTRUCTIONS FROM A FIRST SYSTEM WITH AN OLDER OR INITIAL ONE OR SET OF COMPONENTS TO A SECOND SYSTEM OR PLATFORM WITH ONE OR MORE DIFFERENT COMPONENTS AND NEW OR MODIFIED OPERATIONS OR FUNCTIONS ALONG WITH ADDITIONAL POTENTIAL APPLICATIONS INCLUDING USE IN NETWORK SECURITY AND INTRUSION DETECTION

STATEMENT REGARDING FEDERALLY SPONSORED RESEARCH OR DEVELOPMENT

The invention described herein may be manufactured, used and licensed by or for the United States Government for any governmental purpose without payment of any royalties thereon. This invention (Navy Case 200,381) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to systems and methods for transitioning and updating/tailoring machine instructions from a first system with an older or initial one or set of components to a second system or platform with one or more different components and new or modified operations or functions. Embodiments enable improved obsolescence management, configuration management and tailoring or customization of an initial system's machine instructions to a target application and platform with new or modified capabilities. Alternative embodiments can also be directed to a high security application which uses this system in combination with an additional intrusion detection system which detects file system service commands which do not match a specific set of file system service commands for a particular type of data storage device which is being protected from access then sends an intrusion alert. This additional set of embodiments creates an additional layer of intrusion detection which can be based on creating authorized vs unauthorized systems by using non-conventional file transfer system commands which can be associated with obsolete systems no longer in use or completely different file system service commands created expressly for the purpose of enabling security.

Obsolescence management of computer equipment is a significant challenge given speed of change and lack of backwards compatibility of equipment. For example, older systems used an integrated drive electronics (IDE) bus within a computer compatible with Linux for communicating with an IDE compatible personal computer memory card international association (PCMCIA) drive compatible with linear flash media. Unfortunately, the IDE systems that were compatible with PCMCIA drives are obsolete and are not readily available. Also, post-Windows 98, the Windows OS is no longer compatible with linear flash drivers. Accordingly, there is a need to provide capabilities for transitioning and updating systems that are still in use to accept newer parts or components while also providing an ability to alter the transitioned system to meet current needs associated with the updated system.

In particular, embodiments of the invention enable an activity or technical personnel to transition and update software and library files from an obsolete system to a new system with updated or tailored capabilities or functions directed to new operations or missions as well as the new system, system of systems, and/or platform for the system. Significant effort has been made by Navy personnel to address a number of significant challenges in performing needed lifecycle functions or activities. In one example, involved employing a Universal Serial Bus (USB) as an intermediate line of communication between a personal computer (PC) and an electronics unit containing a tape drive compatible with four track tapes. However, this method however did not transfer the binary tape tracks to linear flash media. Moreover, the four track tapes are obsolete and are not readily available. Thus, when one component (or software element) was replaced, another component or software element also required replacement which created additional multi-variable complexity to attempts to perform lifecycle and obsolescence management tasks.

In an exemplary embodiment, a method (or process) could be used utilizing a Windows® file system on a source computer to update data, then convert the data to tape formatted data, then transfer the tape formatted data via USB to an external linear flash drive and onto linear flash target media for a system that continues to utilize the obsolete tape formatted data but uses Linear Flash media in place of the obsolete tape media. This would enable original software that expects to use the tape formatted data on a non-tape media.

An additional element of the invention can be used to edit aspects of data libraries which are to be transferred to the updated storage medium to update the obsolete tape formatted data to add or change operation of the overall system or components of the system such as threat signatures in security or threat detection systems.

In one example, efforts were directed to a tech refresh or update on a Navy threat detection system but the invention and various embodiments can be used for a wide variety of systems. Moreover, the "tape formatted data" could be adapted for different tape formats than that of the Navy system. In other words, an exemplary system and method could be provided for processing binary tape tracks for linear flash media over a USB interface to a personal computer card interface (PCCI) comprising an interface of the USB to a Navy system's PCCI command bus. Such a system for processing can include (e.g. reading, writing, erasing, and editing, binary tape tracks that are custom formatted for the Navy system) transferring data to and from linear flash media. This exemplary system can use the USB as an intermediate line of communication between the PC (e.g. compatible with the Windows® operating system (OS)) and the electronics unit which contains a PCMCIA drive compatible with linear flash media.

An embodiment with a security application of an embodiment of this disclosure or invention can also include installing a sending system file system services initial translator system to send a first set of file system services commands which are not supported by the sending system's normal operating system (e.g., see FIG. 4, first section 81) therefore a hacker would find a target systems data storage system cannot be scanned using expected commands associated with messages being sent to it from a same originating operating system or originating file system service.

Advantageously, embodiments of the present invention can use a PCMCIA drive that is compatible with linear flash media. Although the PCMCIA drive itself is incompatible with Windows OS (rather, it is compatible with Linux OS) the computer, dedicated as the user interface, is a PC (e.g. compatible with a Windows OS). The USB is a common bus for external communication between the PCs and peripheral electronics (e.g. disclosed herein).

According to one illustrative embodiment of the present disclosure, the described system functions as a personal computer card reproduction unit (PCRU), allowing the user to process binary tape tracks to and from linear flash media.

According to another illustrative embodiment of the present disclosure, the present invention could be adapted so that it interfaces with tape command buses (commercial and otherwise). This embodiment serves as support equipment for the PCCI.

According to a further illustrative embodiment of the present disclosure, the format of the tape blocks can be changed to accommodate (e.g. transfer), tape-based systems other than the Navy application (e.g., threat detection system) to alternative forms and modes of linear flash media. However, this requires that the tape-based system is compatible with alternative forms and modes of linear flash media as well as other types of media.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
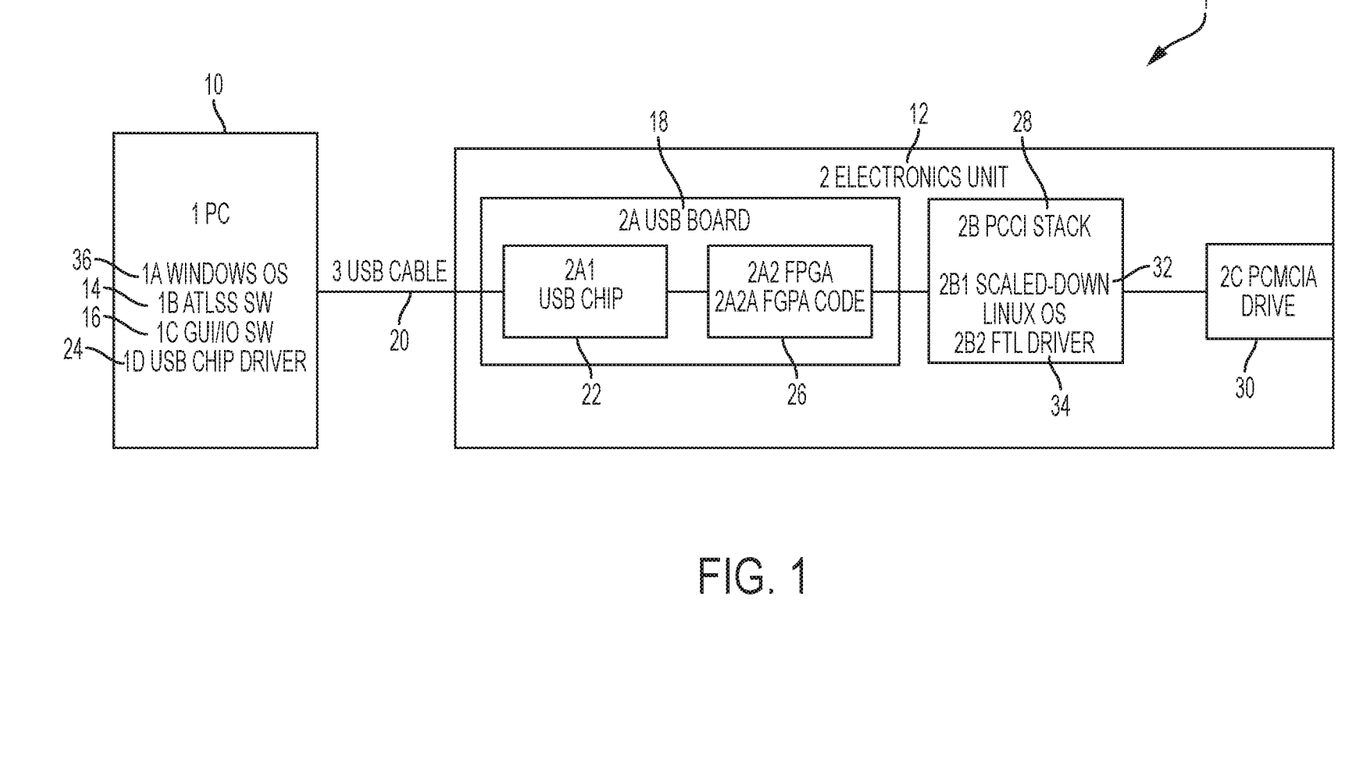
FIG. 1 is a PCRU block diagram showing exemplary hardware and software used in a file transfer and automated threat library update mode.

Referring to FIG. 1 is a block diagram showing the constituent pieces of the PCRU system 1 with hardware, electronics unit 12 and PC 10, both of which are configured with software. Binary tape tracks exist on PC 10 as Windows formatted files via Windows OS 36. In contrast, binary tape tracks exist on linear flash media as flash transition layer (FTL) formatted track directories and block files. The contents of the track directories and block files within track directories are uniquely formatted so that they can be processed by tape system for an application or Navy system (not shown). A user mission or application specific software package is provided that enables creation or update of library or data structures containing data required for operation of the Navy or application system, e.g., an automated threat library support system (ATLSS) 14, used for threat detection or cyber scanning systems which use threat signature data to identify a wide variety of threats such as combinations of signals that indicate an unsafe or threat condition (e.g., Wi-fi is being operated in a parking lot which is communicating with bar code scanners in a retail store indicating a hacker is hacking the bar code scanners to access data without authorization), is installed on PC 10. ATLSS 14 processes, creates, or updates application files such as a lookup table specifically formatted for and designed to be stored on tape systems used with an application system. Exemplary Navy systems can include a threat detection system that detects specific threats (not shown here but see FIG. 4 for exemplary system). The ATLAS system 14 installed on PC 10 to modify the application file designed to be accessed via commands from an operating system or application system originally designed for the first data storage system (e.g. tape system). The GUI/IO software 16 is installed on PC 10 and provides tape commands (not shown) to electronics unit 12. Tape commands (not shown) pass over USB cable 20 to peripheral USB board 18 within electronics unit 12. USB board 18 contains USB chip 22, which is recognized by USB chip driver 24 installed on PC 10. A custom programmed field programmable gate array (FPGA) 26 on USB board 18 processes tape commands (not shown) so that they can be recognized by PCCI stack 28. PCCI stack 28 includes machine instructions that interprets incoming tape commands from the USB board 18 and performs a linear flash equivalent data access operations on a removable linear flash media (not shown) inserted into PCMCIA drive 30. Exemplary PCCI stack 28 contains a scaled down operating system 32 (e.g., Linux OS) and interfaces to PCMCIA drive 30. In at least some embodiments, an operating system or application system operating on an exemplary Navy end use system that the electronics unit 12 is later connected with (or the PC 10 in this example) do not have native or installed capacity to operate second type data storage system(s) in or connected with the electronics unit 12. PCCI stack 28 contains FTL driver 34, thereby allowing memory transfers to the linear flash media (not shown but inserted into the PCMCIA drive 30).

Figure 2:
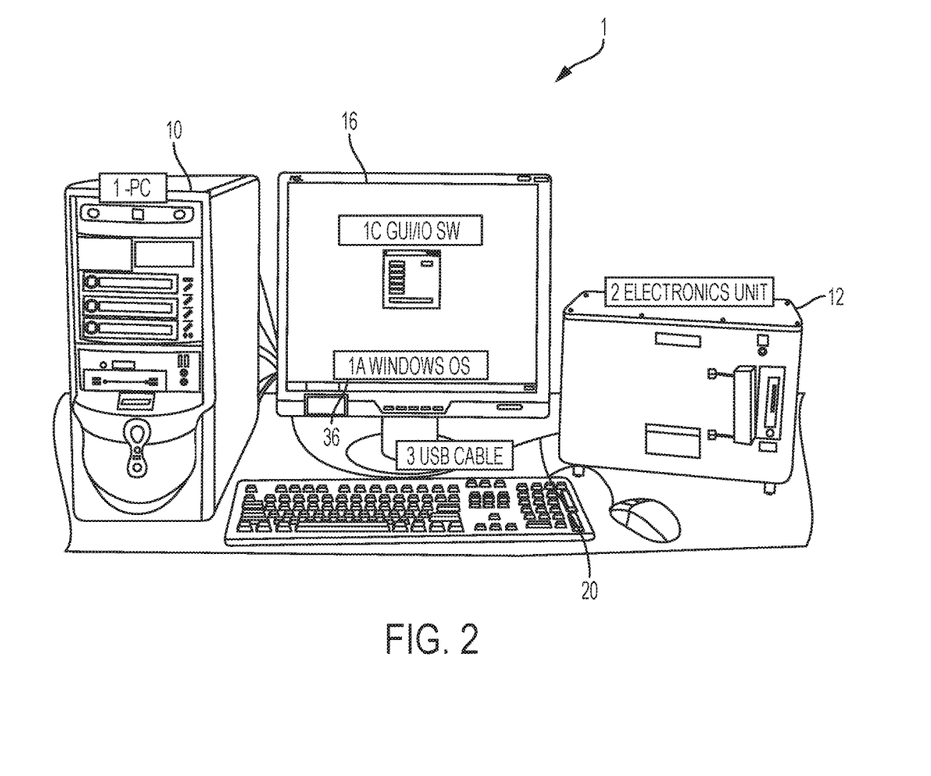
FIG. 2 is an external view of an exemplary PCRU in an operational configuration in the file transfer and library data structure update mode.

Referring to FIG. 2, an external view of exemplary PCRU system 1 described in FIG. 1 in an operational configuration, showing PC 10 connected to electronics unit 12 via USB cable 20, GUI/IO software 16 on a Windows OS 36.

Figure 3:
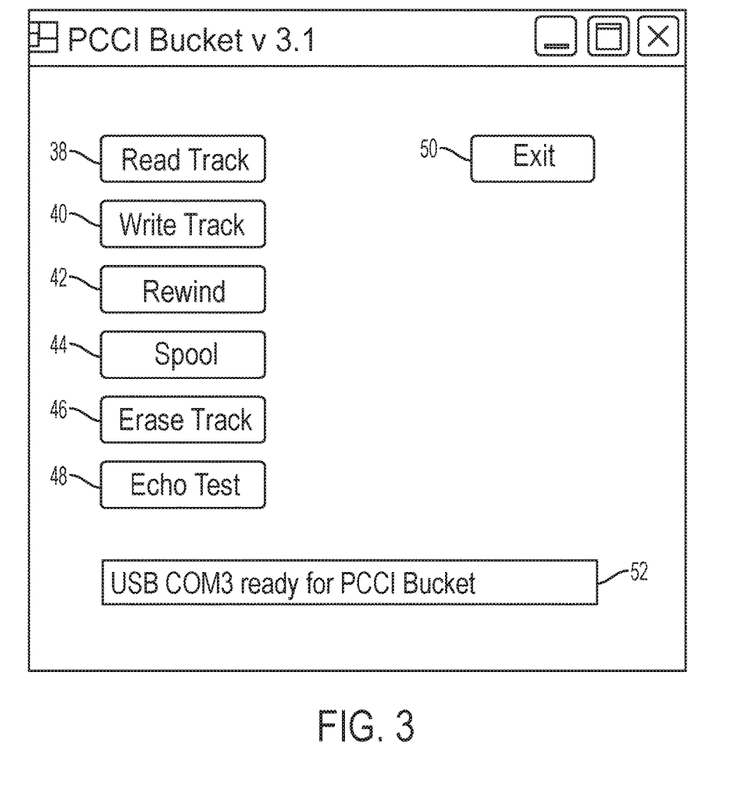
FIG. 3 shows Graphical user interface/input output (GUI/IO) software tape commands.

Referring to FIG. 3, an exemplary GUI/IO user interface software 16 is shown that is generated by machine instructions installed on PC 10 that provides a user an opportunity to graphically select and activate file system service commands (in this case tape drive access, read, write, etc. commands) such as, e.g., read track 38, write track 40, rewind 42, spool 44, erase track 46, and echo test 48, to electronics unit 12 which receives such commands for subsequent processing and file system services with second type storage system(s). GUI/IO software 16 provides an exit option 50 for exiting GUI/IO software 16, and a status window 52 for viewing the real-time status of the exemplary system 10, 12, e.g. if the system 10, 12 is ready for operation.

Figure 4:
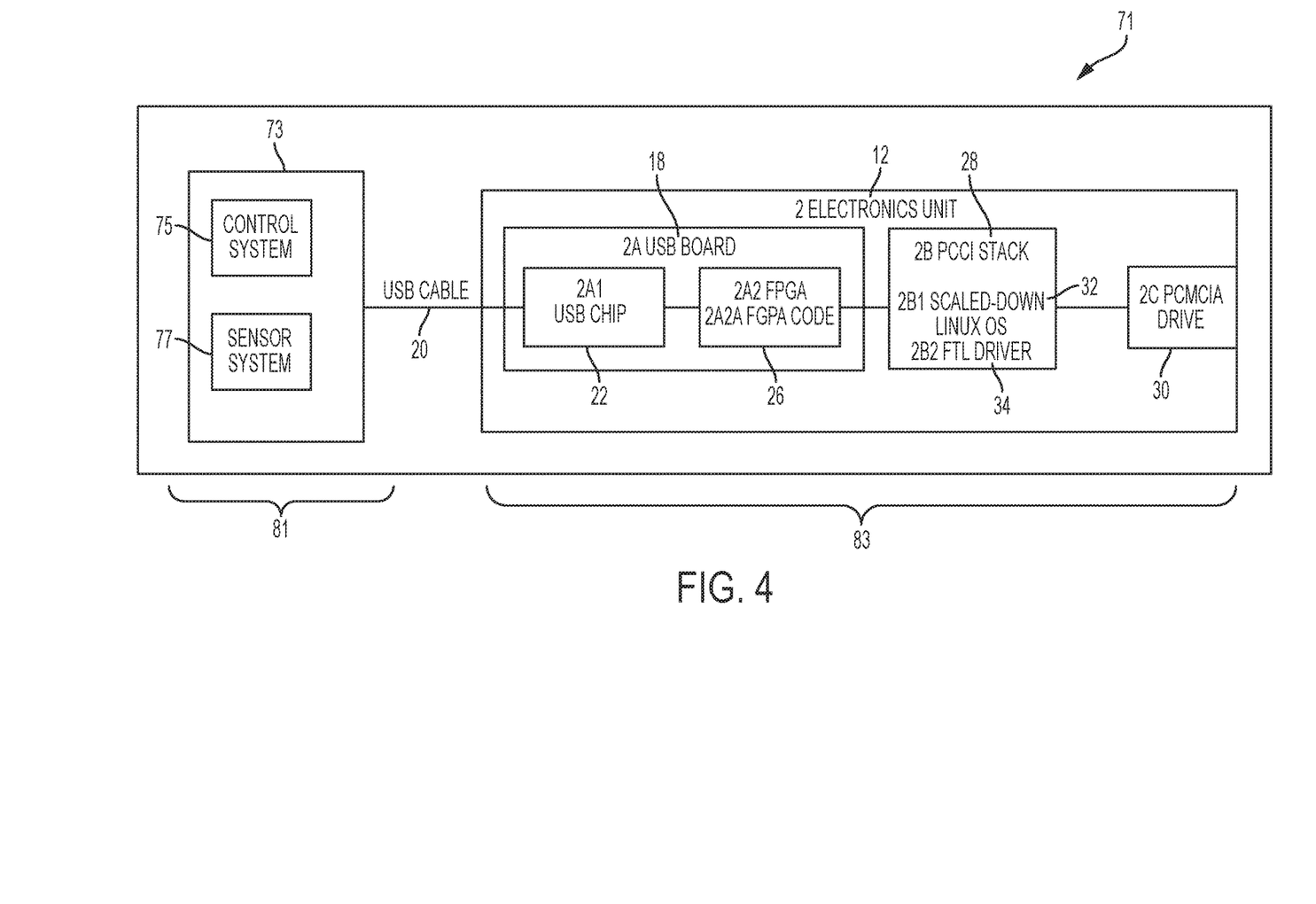
FIG. 4 shows an exemplary embodiment of this disclosure with an end use system is shown.

Referring to FIG. 4, an exemplary embodiment of this disclosure is shown. An exemplary system 71 is provided including an end use equipment system 73 (e.g., including a sensor system 77 with a control system 75) that collectively or singly executes file system services commands (e.g., reads, or writes) data from a first type data storage system (e.g., a tape drive not shown) which has been removed and a second section 83 that includes a data storage management interface section that enables use of different types of removable data storage mediums with a different or second type data storage system 30 (e.g., flash memory or PCMCIA drive with inserted flash memory or media) that has dissimilar file system services instructions (or file management systems and file management commands) than the first type data storage system. This exemplary embodiment enables replacement of the first type data storage system (e.g. tape drive) and use of the second type data storage system 30 (e.g., PCMCIA drive with flash memory inserted) without modification or changing the end use equipment system 73, application system 77, or the control system 75 along with various other advantages and addressing significant unexpected implementation challenges. Some embodiment enables use of the second type data storage system 30 with updated operating systems that do not have native support for the first or the second type data storage systems.

In particular, FIG. 4 shows a first section 81 is provided that includes an end use equipment system 73 that further includes a control system 75 that includes a first plurality of machine instructions and first operating system stored within the first section or end use equipment system 73 (not shown) configured to output a first plurality of file system services commands (e.g., data storage or access machine instructions) for operating a first type data storage system with the first plurality of file system services commands (e.g., tape drive data storage or access machine instructions) such as, for example, a specified magnetic tape system (not shown) that includes instructions such as read track, write track, rewind, spool, erase track, and echo test. The first plurality of file system service commands can more particularly include, e.g., one or more of an exemplary group including rewind, read data stored at a specified file position in a sequential sequence of file positions, write data after a last end of file marker found on a tape, forward space count files or fast forward a specified number of end of file markers, backward space count files or rewind a specified number of end of file markers, and locate a specified file by advancing to after an end of file marker preceding the specified file or where the locate request comprises a request to position the tape drive to a specified block.

A second section 83 is provided including an input and output section that includes a USB Board 18 mounting a USB chip 22 and a FPGA 26 that are configured as a USB interface and bi-directional data buffer for commands going to a PCCI Stack 28, wherein the PCI Stack 28 comprises a circuit board with a processor hosted interface. The PCCI Stack 28 stores and executing a second plurality of machine instructions to output one or more second plurality of file system services commands in response to received one or more said first plurality of file system services commands. In particular, the second plurality of machine instructions performs file system service commands translations from received one or more said first plurality of file system service commands to respective one or more second plurality of file system services commands (e.g., tape drive commands to flash drive commands) for reading/writing data on a second type data storage system 30 coupled with the PCCI Stack 28. In other words, the second plurality of machine instructions respectively matches each of the received said one or more first plurality of file system service commands with a functionally equivalent corresponding one of said plurality of file system service commands for reading, writing or accessing the second type data storage system 30 (e.g., the PCMCIA drive with inserted removable flash memory storage system). In one embodiment, the second plurality of machine instructions writes and reads data on the second type data storage system using a linked list format which corresponds to a file structure sequential organization used in the first type data storage system (e.g., tape drive), and outputs the matched ones of plurality of second plurality of data access machine instructions. The PCCI stack 28 further includes another section including a memory storing a FTL 34 that receives one or more of the second plurality of file system service commands from the second plurality of machine instructions as well as an operating system 32. In particular, the FTL 34 is adapted to receive one or more of the second plurality of file system service commands and operate the second type data storage system 30 (e.g., PCMCIA drive with inserted flash drive system or media). The second section 83 further includes the second type data storage system with inserted removable media, e.g., flash memory storage system.

Figure 5:
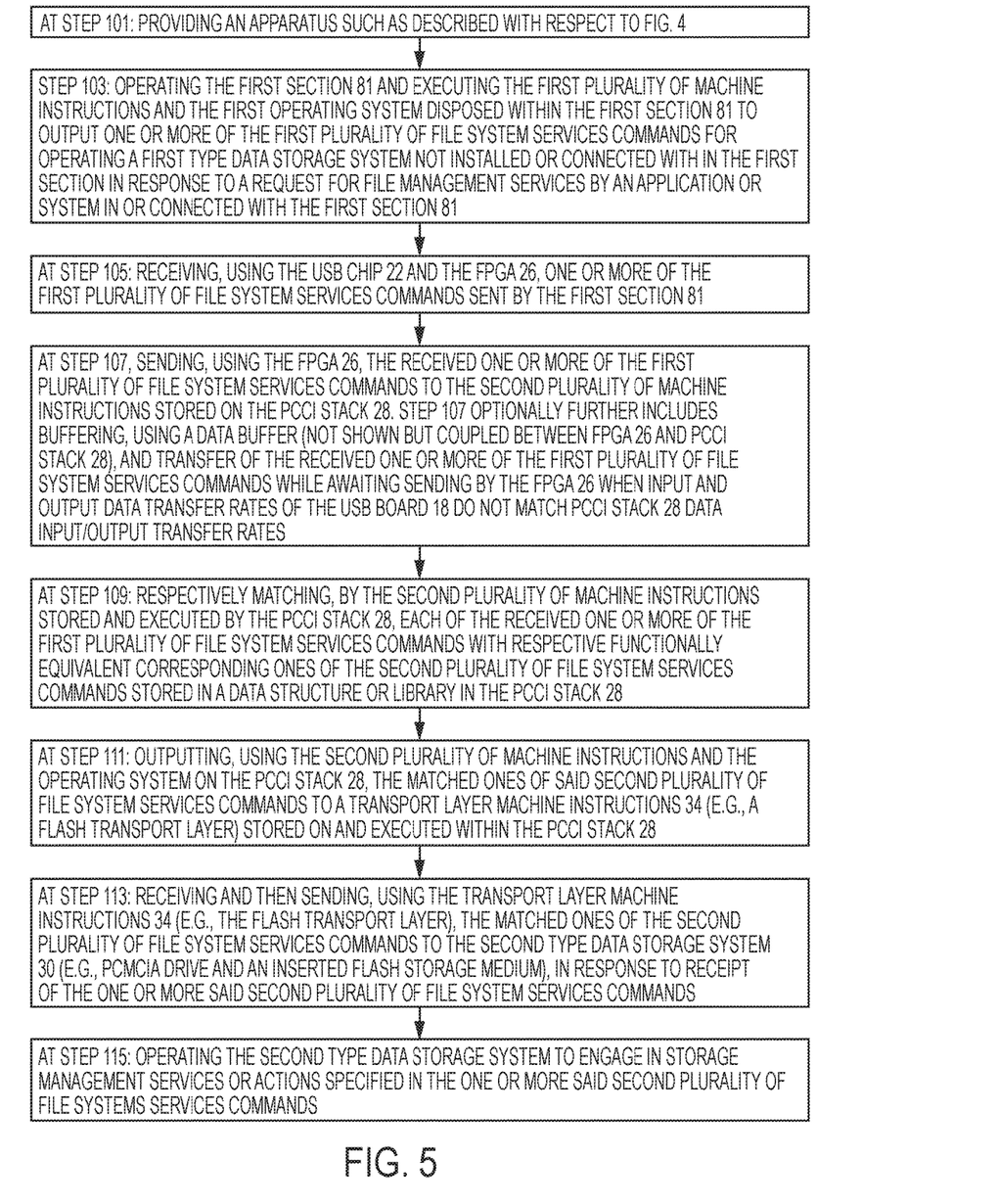
FIG. 5 shows a method of operating an exemplary embodiment of this disclosure.

FIG. 5 shows a method of operating an exemplary embodiment of this disclosure. In particular, the method of FIG. 5 discloses a method of operating a system including an application, data storage interface sections, and a removable data storage medium connected with the data storage interface sections that enables use of different types of removable data storage systems with dissimilar file management systems and file management commands without altering the application. At Step 101: Providing an apparatus such as described with respect to FIG. 4. Step 103: Operating the first section 81 and executing the first plurality of machine instructions and the first operating system disposed within the first section 81 to output one or more of the first plurality of file system services commands for operating a first type data storage system not installed or connected with in the first section in response to a request for file management services by an application or system in or connected with the first section 81. The first plurality of file system services commands include, e.g., data storage or access machine instructions for operating a first type data storage system not installed in or connected with the first section 81. In a particular example, the first plurality of file system services commands that are generated by the first plurality of machine instructions include, e.g., tape drive data storage or access machine instructions. In one example, tape drive data storage or access instructions include instructions for a specified magnetic tape system (not shown) that includes instructions such as read track, write track, rewind, spool, erase track, and echo test. In particular, at Step 103, outputting, using the first plurality of machine instructions and first operating system output, one or more of the first plurality of file system services commands to the second section 83 in response to a request for file management services by an application or system in the first section 81. At Step 105: receiving, using the USB chip 22 and the FPGA 26, one or more of the first plurality of file system services commands sent by the first section 81. At Step 107, sending, using the FPGA 26 the received one or more of the first plurality of file system services commands to the second plurality of machine instructions stored on the PCCI stack 28. Step 107 optionally includes buffering, using a data buffer (not shown but coupled between FPGA 26 and PCCI Stack 28), and transfer of the received one or more of the first plurality of file system services commands while awaiting sending by the FPGA 26 when input and output data transfer rates of the USB Board 18 do not match PCCI Stack 28 data input/output transfer rates. At Step 109: respectively matching, by the second plurality of machine instructions stored and executed by the PCCI Stack 28, each of the received one or more of the first plurality of file system services commands with respective functionally equivalent corresponding ones of the second plurality of file system services commands stored in a data structure or library that includes a look up table in the PCCI Stack 28. At Step 111: outputting, using the second plurality of machine instructions and the operating system on the PCCI Stack 28, the matched ones of said second plurality of file system services commands to a transport layer machine instructions 34 (e.g., a flash transport layer) stored on and executed within the PCCI Stack 28. At Step 113: receiving and then sending, using the transport layer machine instructions 34 (e.g., the flash transport layer), the matched ones of the second plurality of file system services commands to the second type data storage system 30 (e.g., PCMCIA drive and an inserted flash storage medium), in response to receipt of the one or more said second plurality of file system services commands. At Step 115: operating the second type data storage system to engage in storage management services or actions specified in the one or more said second plurality of file systems services commands.

A variety of alternative embodiments of this system are possible. For example, an alternative embodiment can include use of this system in a cybersecurity system where input file system services commands are sent to the second section 83 which further includes a third plurality of machine instructions which detect whether or not the file system services commands are or are not one of the first plurality of file system services commands. Where the input file system services commands are not determined to be one of the second plurality of file system services commands, then an intrusion alert is sent by the third plurality of machine instructions operating in the electronics unit 12 (e.g., on the PCCI Stack 28 or within the FPGA 26 which acts as a guardian of the PCCI Stack 28 and second type data storage system 30. The intrusion alert can then be sent to a network router (not shown) to refuse to route data originating from the source of the input file system services commands. In this example, authorized systems can be designed to use obsolete file system services commands such as with a tape drive or a completely different set of file system services commands. An advantage of this system includes an ability to absolutely prevent an intruder to scan a network even with network access credentials given there is a second set of authentication built into the system directly into authorized system applications. Network personnel can then take action to notify law enforcement and applicable first responders.

Another alternative embodiment includes using this system to secure security watchdog or surveillance systems software update or threat signature update systems. One problem that exists is preventing hackers from modifying scanner systems to ignore hacker intrusion software or activities. This embodiment can be used to update or access scanner software systems, to include security updates. The electronics unit 12 can be a secure system with physical intrusion and anti-tamper structures such as an alarm system, detection of whether or not the electronics unit 12 has been disconnected from the network, encryption etc.

Although the invention has been described in detail with reference to certain preferred embodiments, variations and modifications exist within the spirit and scope of the invention as described and defined in the following claims.

What is claimed is:

1. A system with multiple file management services systems comprising:

a first section including an end use equipment system that further includes a control system that further includes a first plurality of machine instructions and first operating system stored within the first section that operates the first section to output a first plurality of file system services commands comprising data storage or access machine instructions for operating a first type data storage system with the first plurality of file system services commands including tape drive data storage or access machine instructions for a predetermined magnetic tape system that includes instructions including read track, write track, rewind, spool, erase track, and echo test; and a second section that includes a first input and output section coupled with the first section, the first input and output section comprising a first universal serial bus (USB) Board as well as a personal computer card interface (PCCI) Stack, the second section further comprising a second type data storage system, wherein the first input and output section is coupled with the first section for receiving the first plurality of file system services commands, wherein the first USB Board mounts a first USB chip and a first field programmable gate array (FPGA) that are configured as a first USB interface and bi-directional data buffer for commands going to the PCCI Stack, wherein the PCCI stack stores and executes a second plurality of machine instructions to output one or more second plurality of file system services commands in response to received one or more said first plurality of file system services commands, wherein the second plurality of machine instructions performs file system services commands translations from received one or more said first plurality of file system services commands to respective one or more second plurality of file system services commands including translation of said tape drive data storage or access machine instructions to flash drive commands for reading/writing data on the second type data storage system where the second plurality of machine instructions respectively matches each of the received said one or more first plurality of file system services commands from the first section with a functionally equivalent corresponding one of said second plurality of file system services commands for reading, writing or accessing the second type data storage system, wherein the second plurality of machine instructions writes and reads data on the second type data storage system using a linked list format which corresponds to a file structure sequential organization used in the first type data storage system, and outputs the matched ones of plurality of second plurality of data access machine instructions, wherein the PCCI stack comprises a circuit board with a processor hosted interface, wherein the PCCI stack further includes a memory storing a transport layer machine instruction section that receives one or more of the second plurality of file system services commands from the second plurality of machine instructions where the transport layer machine instruction section is adapted to receive one or more of the second plurality of file system services commands and operate the second type data storage system.

2. A system as in claim 1, wherein the second type data storage system comprise a removable flash drive memory system.

3. The system as in claim 1, wherein the end use equipment system comprises a threat detection system that comprises a sensor system with a sensor control system, wherein the sensor controls control system executes collectively or singly executes said first plurality of file system services commands and sends them to the second section.

4. The system of claim 3, wherein the second type data storage system further comprises an automated threat library support system (ATLSS) that is accessed by the threat detection system and its control system.

5. The system as in claim 4, wherein the threat detection system comprises scanning systems which use threat signature data within the ATLSS system to identify combinations of signals that indicate a threat condition.

6. The system as in claim 5, wherein the unsafe or threat condition comprises a detected Wi-fi system operated in a parking lot which is communicating with equipment within in a building indicating an unauthorized entity is improperly accessing the equipment within the building.

7. A system as in claim 1, further comprising:
a computer with a second operating system, a library comprising a plurality of end use equipment data, a graphical user interface, an input/output software for outputting the plurality of end use equipment data in said file structure sequential organization used in the first type data storage system that includes binary tape track data format in response to commands received at least from the graphical user interface;
a data storage interface unit coupled to said the computer, said data storage interface unit, the data storage interface unit further comprises a computer card interface command bus stack, wherein said second type data storage system comprises a removable linear flash media, said computer card interface command bus stack further comprising an operating system, a flash transition layer driver for memory transfers to the removable linear flash media, wherein the data storage interface unit further comprises a computer memory card international association drive interface section adapted to selectively receive and interface with said linear flash media.

8. A system with multiple file management services systems comprising:
a first section including an end use equipment system that further includes a control system that further includes a first plurality of machine instructions and first operating system stored within the first section that operates the first section to output a first plurality of file system services commands comprising data storage or access machine instructions for operating a first type data storage system with the first plurality of file system services commands including tape drive data storage or access machine instructions for a predetermined magnetic tape system that includes instructions including read track, write track, rewind, spool, erase track, and echo test; and
a second section that includes a first input and output section coupled with the first section, and a second type data storage system comprising a removable flash memory, wherein the first input and output section is coupled with the first section for receiving the first plurality of file system services commands, wherein the second section stores and executes a second plurality of machine instructions to output one or more second plurality of file system services commands in response to received one or more said first plurality of file system services commands, wherein the second plurality of machine instructions performs file system services commands translations from received one or more said first plurality of file system services commands to respective one or more second plurality of file system services commands including translation of said tape drive data storage or access machine instructions to flash drive commands for reading/writing data on the second type data storage system where the second plurality of machine instructions respectively matches each of the received said one or more first plurality of file system services commands from the first section with a functionally equivalent corresponding one of said second plurality of file system services commands for reading, writing or accessing the removable second type data storage system, wherein the second plurality of machine instructions writes and reads data on the removable second type data storage system using a linked list format which corresponds to a file structure sequential organization used in the first type data storage system, and outputs the matched ones of plurality of second plurality of data access machine instructions, wherein the second section further includes a memory storing a transport layer machine instruction section that receives one or more of the second plurality of file system services commands from the second plurality of machine instructions where the transport layer machine instruction section is adapted to receive one or more of the second plurality of file system services commands and operate the removable second type data storage system.

9. The system as in claim 8, wherein said end use equipment system comprises a threat detection system that comprises a sensor system with a sensor control system, wherein the sensor controls control system executes collectively or singly executes said first plurality of file system services commands and sends them to the second section.

10. The system of claim 9, wherein the second type data storage system further comprises an automated threat library support system (ATLSS) that is accessed by the threat detection system and its control system.

11. The system as in claim 10, wherein the threat detection system comprises scanning systems which use threat signature data within the ATLSS system to identify combinations of signals that indicate a threat condition.

12. The system as in claim 11, wherein the unsafe or threat condition comprises a detected Wi-fi system operated in a parking lot which is communicating with equipment within in a building indicating an unauthorized entity is improperly accessing the equipment within the building.

13. The system as in claim 8, wherein the first input and output section further comprises a universal serial bus (USB) Board as well as a personal computer card interface (PCCI) Stack.

14. The system as in claim 13, wherein the first USB Board mounts a first USB chip and a first field programmable gate array (FPGA) that are configured as a first USB interface and bi-directional data buffer for commands going to the PCCI Stack, wherein the PCCI stack stores and executes the second plurality of machine instructions to output one or more second plurality of file system services commands in response to received one or more said first plurality of file system services commands.

15. The system as in claim 14, wherein the PCCI stack comprises a circuit board with a processor hosted interface, wherein the PCCI stack further includes a memory storing the transport layer machine instruction section.

* * * * *